(12) United States Patent
Sumida

(10) Patent No.: US 6,175,795 B1
(45) Date of Patent: Jan. 16, 2001

(54) ON-VEHICLE ELECTRONIC CONTROL UNIT

(75) Inventor: Yoshitaka Sumida, Nagoya (JP)

(73) Assignees: Harness System Technologies Research, Ltd., Nagoya; Sumitomo Wiring Systems, Ltd., Mie; Sumitomo Electric Industries, Ltd., Osaka, all of (JP)

(*) Notice: Under 35 U.S.C. 154(b), the term of this patent shall be extended for 0 days.

(21) Appl. No.: 09/109,731

(22) Filed: Jul. 2, 1998

(30) Foreign Application Priority Data

Jul. 10, 1997 (JP) .................................................. 9-185102

(51) Int. Cl.[7] .................................................... G06F 15/16
(52) U.S. Cl. .............................................. 701/49; 701/29
(58) Field of Search .................................. 701/49, 29, 35, 701/36

(56) References Cited

U.S. PATENT DOCUMENTS 4,348,726 * 9/1982 Igarashi et al. ............................ 701/36
4,500,820 * 2/1985 Noto et al. ............................... 318/139
4,876,649 * 10/1989 Kawai et al. ............................ 701/49
5,063,513 * 11/1991 Shank et al. ............................ 701/36

* cited by examiner

*Primary Examiner*—Tan Nguyen
(74) *Attorney, Agent, or Firm*—Oliff & Berridge, PLC

(57) ABSTRACT

The invention provides an on-vehicle electronic control unit wherein all types of combinations of electrical equipment can be controlled by the electronic control unit with a common arrangement without changing the arrangement of the microcomputer, the print circuit board or the like, which makes it possible to reduce the number of parts of the on-vehicle electronic control unit to a large extent and reduce the cost thereof. The memory portion of a microcomputer of the electronic control unit stores the control programs for all types of electrical equipment to be controlled. Input terminals are opened and/or ground in accordance with the combination of electrical equipment to be controlled so that the microcomputer can recognize the type of the control program to read from the memory portion. In this manner, the electronic control unit is adapted to the change of the combination of the electrical equipment without changing the hardware arrangement. In this case, an alarm for key-forgotten state and a room lamp are both provided normally, and motors for locking and unlocking an electric door lock system are provided optionally so that they can be replaced by other electrical equipment such as electric flexible outer mirrors or other devices.

6 Claims, 7 Drawing Sheets

ON-VEHICLE ELECTRONIC CONTROL UNIT

BACKGROUND OF THE INVENTION

1. Field of Invention

The invention relates to an on-vehicle electronic control unit for controlling electrical equipment.

2. Description of Related Art

In recent years, automobiles have been provided with various electrical equipment such as an electric door lock systems, electric flexible outer mirrors and similar devices. The electrical equipment to be provided differs depending on the type and grade, etc., of an automobile as well as the utility of the automobile, i.e., a commercial car, etc.

Conventionally, electronic control units for controlling the electrical equipment are arranged and mounted on automobiles in a manner such that a dedicated electronic control unit is provided for each combination of electrical equipment mounted on the vehicle.

Thus, the conventional electronic control units are required to be manufactured such that the number of types of dedicated electronic control units is same as the number of types of combinations of electrical equipment. As a consequence, since the microcomputer and the print circuit board of the electronic control unit are required to be designed and manufactured independently depending on the type of the combination of electrical equipment, there arises a problem that the cost of the electronic control unit becomes expensive and the management of the parts thereof becomes complicated.

SUMMARY OF THE INVENTION

Therefore, in view of the aforesaid problem of the conventional art, an object of the invention is to provide an on-vehicle electronic control unit, wherein all types of combinations of electrical equipment can be controlled by the electronic control unit via a common arrangement without changing the arrangement of the microcomputer and the print circuit board, or similar device, so as to reduce the number of parts of the on-vehicle electronic control unit to a large extent and reduce its cost.

In order to achieve the aforesaid object, an on-vehicle electronic control unit provided in a vehicle for controlling electrical equipment mounted thereon comprises an input terminal electrically connectable to at least one type of arbitrary input side electrical equipment among multiple types of electrical equipment capable of being mounted on the vehicle; an output terminal electrically connectable to at least one type of arbitrary output side electrical equipment among the multiple types of electrical equipment capable of being mounted on the vehicle; a switching terminal which receives a signal representing which ones of the multiple types of electrical equipment are connected to the input and output terminals; and a control means connected to the input, output and switching terminals, the control means having multiple types of control modes such that the control mode can be changed in accordance with the type of combination of the multiple types of electrical equipment to be connected to the input and output terminals, and the control means changing its control mode in accordance with the signal inputted through the switching terminal to another control mode corresponding to the combination of electrical equipment represented by the signal and controlling the output side electrical equipment connected to the output terminal in accordance with the input signal inputted from the input side electrical equipment through the input terminal.

Preferably, the control means includes a memory portion storing multiple types of control programs, in accordance with the type of the output side electrical equipment to be connectable to the output terminal, for controlling the output side electrical equipment connected to the output terminal in accordance with the input signal inputted from the input side electrical equipment through the input terminal; a control portion for controlling the output side electrical equipment connected to the output terminal on a basis of the input signal inputted from the input side electrical equipment through the input terminal in accordance with the control program read from the memory portion; and a switching portion for informing the control portion of one type of control program to be read corresponding to the output side electrical equipment connected to the output terminal from the multiple types of control programs stored in the memory portion on the basis of the signal inputted through the switching terminal so as to change the control mode of the control means into the control mode corresponding to the combination of the electrical equipment connected to the input and output terminals.

DETAILED DESCRIPTION OF PREFERRED EMBODIMENTS

Figure 1:
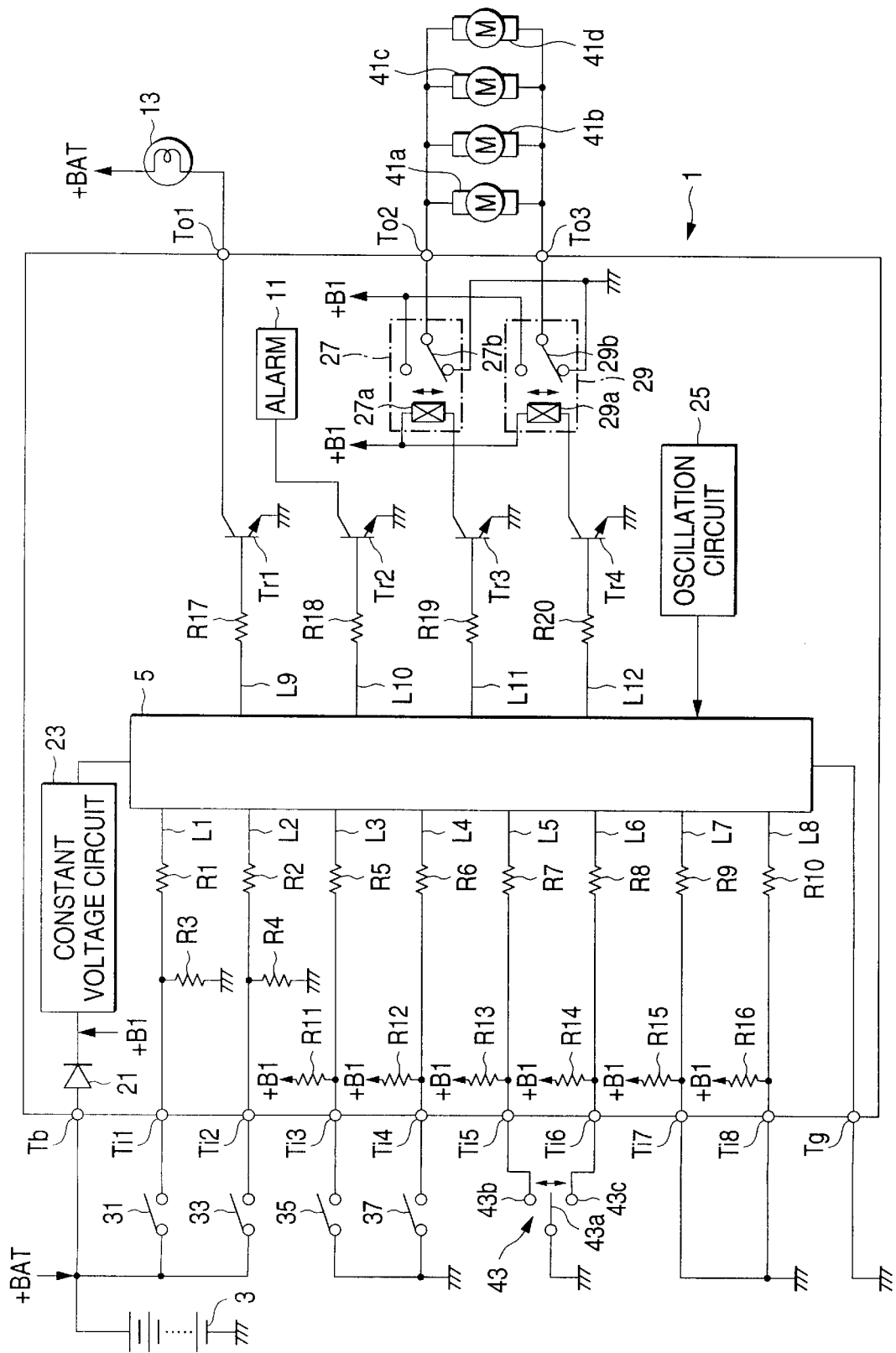
FIG. 1 is a block diagram showing an arrangement of an on-vehicle electronic control unit according to an embodiment of the invention wherein an electric door lock system is connected as optional equipment.
Figure 2:
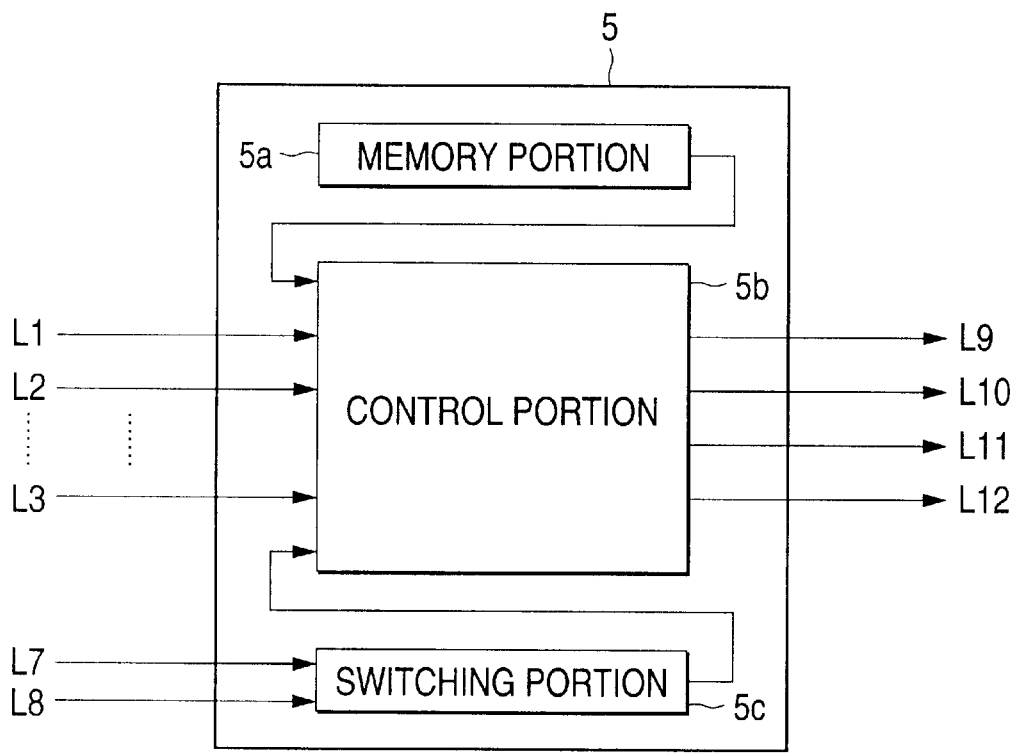
FIG. 2 is a diagram showing an arrangement of a microcomputer provided in the on-vehicle electronic control unit of FIG. 1.

FIG. 1 is a block diagram showing an arrangement of an on-vehicle electronic control unit according to an embodiment of the invention, and FIG. 2 is a block diagram showing an arrangement of a microcomputer provided in the electronic control unit. The electronic control unit 1 is provided with a battery input terminal Tb and a ground terminal Tg electrically connected to the anode and cathode electrode terminals of a battery 3, respectively, input terminals Ti1 to Ti8, and output terminals To1 to To3. Each of these terminals Tb, Tg, Ti1 to Ti8 and To1 to To3 is connected to the microcomputer (control means) 5 provided in the unit 1 through a certain circuit. The input terminals Ti7 and Ti8 of the input terminals Ti1 to Ti8 correspond to switching terminals of the invention.

In the electronic control unit 1, the control of an alarm 11 for a key-forgotten state and a room lamp 13, both provided normally in a vehicle, and the control of various electrical equipment provided optionally, can be performed by the common arrangement without changing the arrangement of the microcomputer 5, the print circuit board or other devices. In this embodiment, examples of the electrical equipment provided optionally include an electrical door lock system, electrical flexible outer doors, a fuel opener for electrically opening a lid of a fuel supply opening, a trunk opener for electrically opening a trunk, and left and right side cornering lamps 15 and 17 (see FIG. 6) for illuminating a direction to which a vehicle changes its running direction interlocked with blinkers (flashers). While, in the present embodiment, the alarm 11 is provided in the electronic control unit 1, the alarm may be provided outside of the unit 1.

Of the input terminals Ti1 to Ti8, the input terminals Ti1 to Ti4 receive signals required at the time of controlling the alarm 11 for a key-forgotten state and the room lamp 13, both of which are normally provided. The input terminals Ti5 and Ti6 receive signals required at the time of controlling the optionally provided electrical equipment, and the input terminals Ti7 and Ti8 receive switching signals for changing the control mode of the microcomputer 5 in accordance with the type of optionally provided electrical equipment. Of the output terminals To1 to To3, the output terminal To1 connects the unit to the room lamp 13, and the output terminals To2 and To3 connect the unit to the optionally provided electrical equipment.

The battery input terminal Tb and the microcomputer 5 are connected by a power supply line through a diode 21 and a constant voltage circuit 23. The ground terminal Tg is connected to a ground line which is connected to the respective portions of the electronic control unit 1. Connection lines L1, L2 for connecting the input terminals Ti1, Ti2 and the input terminals of the microcomputer 5 through resistors R1, R2 are grounded through resistors R3, R4, respectively, so that low level signals are inputted to the microcomputer 5 through the connection lines L1, L2 in a state where the input terminals Ti1, Ti2 are electrically opened, respectively.

Connection lines L3 to L8 for connecting the input terminals Ti3 to Ti8 and the input terminals of the microcomputer 5 through resistors R5 to R10 are connected to the battery through resistors R11 to R16, respectively, so that high level signals are inputted to the microcomputer 5 through the connection lines L3 to L8 in a state where the input terminals Ti3 to Ti8 are electrically opened, respectively. The microcomputer 5 also receives a clock signal outputted from an oscillation circuit 25.

A plurality of connection lines, that is, four connection lines L9 to L12 in this embodiment, are connected to the output terminals of the microcomputer 5. The connection line L9 is connected to the output terminal To1 through a resistor R17 and a switching transistor Tr1. The connection line L10 is connected to the alarm 11 through a resistor R18 and a switching transistor Tr2. The connection line L11 is connected to the output terminal To2 through a resistor R19, a transistor Tr3 and a relay switch 27. The connection line L12 is connected to the output terminal To3 through a resistor R20, a transistor Tr4 and a relay switch 29.

Each of the transistors Tr1 to Tr4 is turned on and off in accordance with the high and low levels of the output signal from the microcomputer 5, respectively. In this embodiment, when the transistor Tr1 is turned on, the output terminal To1 is grounded. When the transistor Tr2 is turned on, the alarm 11 is turned on to output an alarm. When the transistors Tr3 and Tr4 are turned on, current is supplied to the relay coils 27a, 29a of the relay switches 27, 29, so that each of the movable contacts 27b, 29b of these relay switches is shifted from the connection position connected to a ground side contact to the connection position connected to a battery side contact. Thus, each of the output terminals To2 and To3 is changed from the grounded state to the state being connected to the battery. In this manner, the movable contacts 27b, 29b connected to the battery side contacts are shifted to the ground side contacts in response to the turning-off of the transistors Tr3, Tr4, respectively.

The microcomputer 5 includes a memory portion 5a formed by a read only memory (ROM) storing control programs (including control data) necessary for controlling the electrical equipment, a control portion 5b for controlling the respective electrical equipment on the basis of the control program and the control data stored in the memory portion 5a, and a switching portion 5c for changing the control mode of the control portion 5b in accordance with the combination of the electrical equipment to be controlled. The control portion 5b and the switching portion 5c are formed by a central processing unit (CPU) and a random access memory (RAM) or similar devices.

Figure 3:
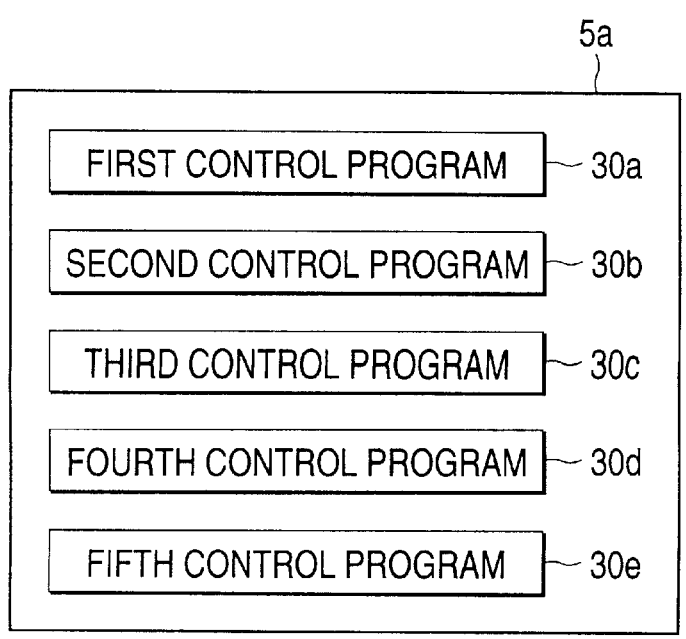
FIG. 3 is a diagram showing the storage content of a memory portion provided in the microcomputer of FIG. 2.

As shown in FIG. 3, the memory portion 5a stores therein a first control program 30a for controlling the normally provided electrical equipment of the alarm 11 and the room lamp 13, and second to fifth control programs 30b to 30e for controlling the optionally provided electrical equipment of the electrical door lock system, the electrical flexible outer doors, the fuel opener and the trunk opener, and the cornering lamps 15, 17, respectively.

The switching portion 5c receives the switching signals for changing the control mode through the connection lines L7, L8. The electronic control unit 1 of this embodiment is arranged so as to be accorded with the four combinations of electrical equipment, that is, the combination of the normally provided electrical equipment of the alarm 11 and the room lamp 13 and the electrical door lock system, the combination of the normally provided electrical equipment and the electrical flexible outer doors, the combination of the normally provided electrical equipment and the set of the fuel opener and the trunk opener, and the combination of the normally provided electrical equipment and the cornering lamps 15, 17. The signal levels of the switching signals to be inputted into the microcomputer 5 through the connection lines L7, L8 are changed by opening and/or grounding the input terminals Ti7, Ti8, whereby the signal levels of the switching signals represent which one of the four combinations is selected, that is, which of the optionally provided electrical equipment is selected.

In this embodiment, the levels of the respective switching signals inputted through the connection lines L7, L8 are changed into (low, low)(FIG. 1), (high, low) (FIG. 4), (high, high) (FIG. 5) and (low, high) (FIG. 6) depending on whether the electrical door lock system, the electrical flexible outer doors, the set of the fuel opener and the trunk opener, and the cornering lamps 15, 17 are selected as the optionally provided electrical equipment, respectively.

When the microcomputer 5 is supplied with power, the switching portion 5c recognizes the combination of the electrical equipment to be controlled on the basis of the signal levels of the inputted switching signals, and then instructs the control portion 5b on one of the second to fifth control programs 30b to 30e to read in on the basis of the recognition result. The control portion 5b, which already reads in the first control program 30a in response to the power supply thereto, reads the one of the second to fifth control programs 30b to 30e instructed by the switching portion 5c in response to the instruction from the control portion 5b. Thus, the control mode of the control portion 5b is shifted to that corresponding to the combination of the electrical equipment to be controlled, so that the control portion 5b controls the respective electrical equipment on the basis of the control program 30a and the one of the control programs 30b to 30e thus read.

The relationship between the electronic control unit 1 and the normally provided electrical equipment is discussed below. An ignition switch 31 provided at an ignition key cylinder, an accessory switch 33, a key detection switch 35 for detecting the key insertion state, and a courtesy switch 37 for detecting the opening and closing of the doors are connected to the input terminals Ti1 to Ti4, respectively. The input signals inputted into the microcomputer 5 through the connection lines L1 to L4 change between the high and low levels depending on the on and off states of the switches 31, 33, 35 and 37, respectively.

When the courtesy switch 37 is turned on in response to the opening of the door thereby to change the input signal inputted into the microcomputer 5 through the connection line L4 from the high level to the low level, the microcomputer 5 detects that the door has been opened and hence changes the output signal outputted through the connection line L9 from the low level to the high level to turn on the transistor Tr1 and turn on the room lamp 13. In contrast, when the input signal inputted into the microcomputer 5 through the connection lines L4 changes from the low level to the high level, the microcomputer 5 detects that the door has been closed and hence changes the output signal outputted through the connection line L9 from the high level to the low level to turn off the room lamp 13.

In a state where the key detection switch 35, having been turned on due to the insertion of the key into the ignition key cylinder and hence the input signal inputted into the microcomputer 5 through the connection line L3, is in the low level, if the microcomputer 5 detects that the door has been opened through the turning-on of the courtesy switch 37, the microcomputer 5 changes the output signal outputted through the connection line L10 from the low level to the high level to turn on the transistor Tr2, thereby to operate the alarm 11 so as to notify a driver of the key-forgotten state.

The relationship between the electronic control unit 1 and the optionally provided electrical equipment is explained with reference to FIGS. 1, 4, 5 and 6. In FIG. 1, the positive and negative terminals of each of motors 41a to 41d, respectively provided at the doors for locking and unlocking the corresponding doors, are connected in parallel to the output terminals To2 and To3. An operation switch 43 for accepting a user's operation input is connected to the input terminals Ti5 and Ti6. The motors 41a to 41d and the operation switch 43 form the electric door lock system. In this arrangement, both the input terminals Ti7 and Ti8 are grounded.

The operation switch 43 includes a grounded movable contact 43a interlocked with an operation portion (not shown) and two contacts 43b, 43c connected to the input terminals Ti5, Ti6, respectively. The movable contact 43a is selectively connected to one of the contacts 43b and 43c when the operation portion is operated so as to lock or unlock the door, and automatically restored to a state being connected to none of the contacts 43b and 43c in response to the cancellation of the operation to the operation portion.

When the microcomputer 5 detects that one of the input signals inputted therein through the connection lines L5 and L6 has been changed from the high level to the low level, the microcomputer changes one of the output signals outputted to the transistors Tr3 and Tr4 from the low level to the high level, thereby to drive the motors 41a to 41d to rotate forwardly or reversely to lock or unlock the respective doors.

When the operation switch 43 is operated to connect the movable contact 43a of the operation switch 43 to the contact 43b, thereby to change the input signal inputted to the microcomputer 5 through the connection line L5 from the high level to the low level, the output signal outputted to the transistor Tr4 from the microcomputer is maintained in the low level, but the output signal outputted to the transistor Tr3 is changed from the low level to the high level. Thus, the transistor Tr3 is turned on while the transistor Tr4 is kept in the off state, so that the movable contact 27b of the relay switch 27 is shifted from the ground side to the battery side, while the movable contact 29b of the relay switch 29 is maintained connected to the ground side. As a consequence, the respective motors 41a to 41d are supplied with power through the output terminals To2, To3 and rotated to the forward direction thereby to lock the doors.

When the operation switch 43 is operated to connect the movable contact 43a of the operation switch 43 to the contact 43c, thereby to change the input signal inputted to the microcomputer 5 through the connection line L6 from the high level to the low level, the output signal outputted to the transistor Tr3 from the microcomputer 5 is maintained at the low level, but the output signal outputted to the transistor Tr4 is changed from the low level to the high level. Thus, the transistor Tr4 is turned on while the transistor Tr3 is maintained in the off state, so that the movable contact 29b of the relay switch 29 is shifted from the ground side to the battery side, while the movable contact 27b of the relay switch 27 is maintained connected to the ground side. As a consequence, the respective motors 41a to 41d are supplied with power through the output terminals To2, To3 and rotated to the reverse direction thereby to unlock the doors.

Figure 4:
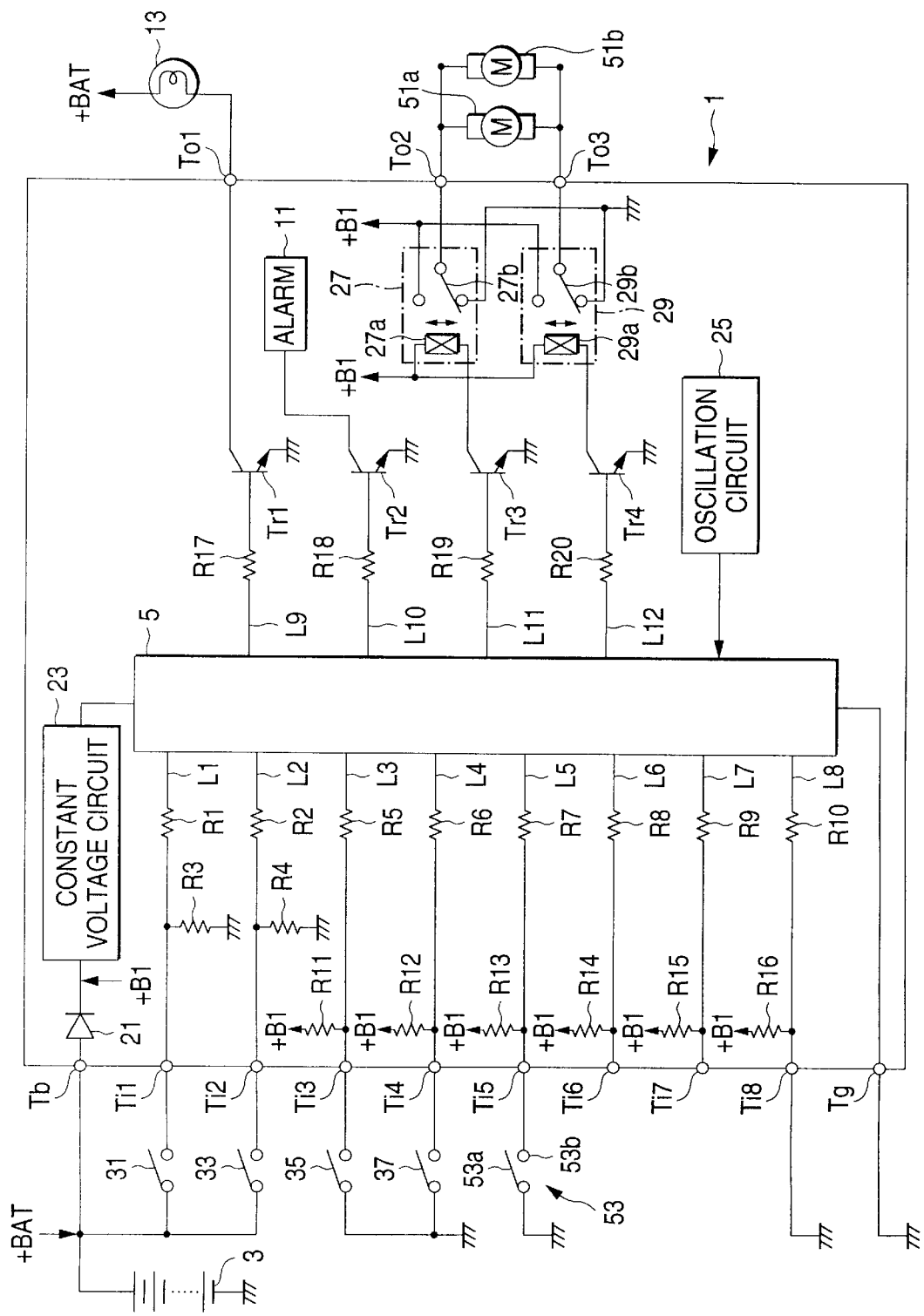
FIG. 4 is a block diagram showing an arrangement of an on-vehicle electronic control unit according to an embodiment of the invention wherein electric flexible outer mirrors are connected as optional equipment.

In FIG. 4, the positive and negative terminals of each of motors 51a and 51b, respectively provided at the left and right electric flexible outer mirrors for driving the mirrors to close and open the mirrors, are connected in parallel to the output terminals To2 and To3. An operation switch 53 for accepting a user's operation input is connected to the input terminal Ti5. The mirrors can be opened and closed by operating the operation switch 53. In this arrangement, both the input terminals Ti6 and Ti7 are opened and the input terminal Ti8 is grounded.

The operation switch 53 is turned on when an operation portion (not shown) is operated and turned off in response to the cancellation of the operation to the operation portion. When the operation switch 53 is turned on, the input terminal Ti5 is grounded through the operation switch 53, so that the signal inputted into the microcomputer 5 through the connection line L5 is changed from the high level to the low level.

The microcomputer 5 recognizes the opening and closing state of the mirrors. When the microcomputer detects that the input signal inputted therein through the connection line L5 has been changed from the high level to the low level, the microcomputer changes the level of one of the output signals outputted to the transistors Tr3 and Tr4 respectively through the connection lines L11 and L12 from the low level to the high level, so that the motors 51a and 51b are driven and rotated forwardly or reversely thereby to change the respective mirrors from the opened state to the closed state (housed state) or vise versa.

Figure 5:
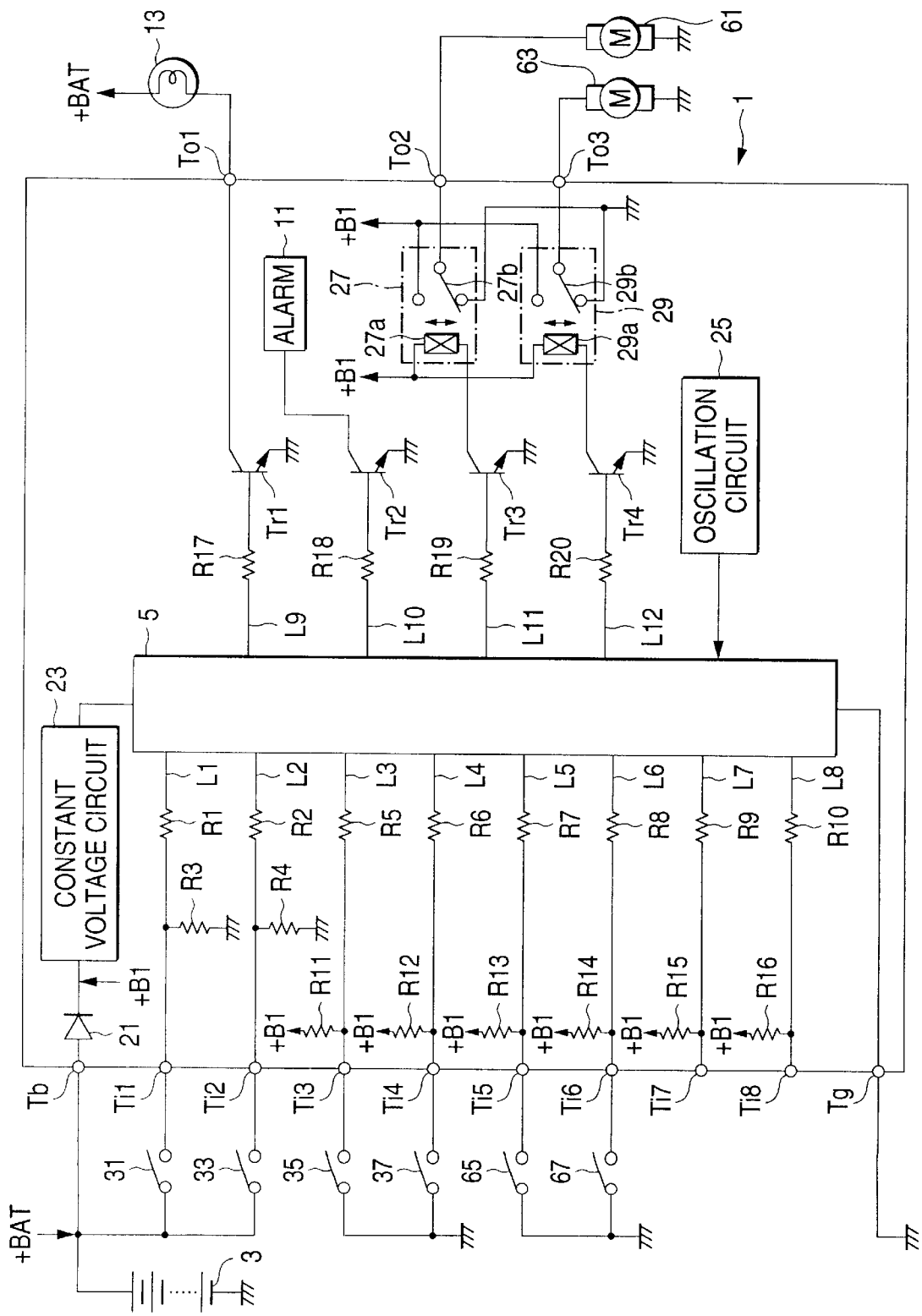
FIG. 5 is a block diagram showing an arrangement of an on-vehicle electronic control unit according to an embodiment of the invention wherein a trunk opener and a fuel opener are connected as optional equipment.

In FIG. 5, the positive terminal of a motor 61 provided at the trunk opener for opening (or unlocking) the trunk is connected to the output terminal To2, and the positive terminal of a motor 63 provided at the fuel opener for opening the lid of the fuel supply opening is connected to the output terminal To3. Further, operation switches 65 and 67 for accepting a user's operation inputs for operating the trunk opener and the fuel opener are connected to the input terminals Ti5 and Ti6, respectively. In this arrangement, the negative terminals of the motors 61 and 63 are grounded and both the input terminals Ti7 and Ti8 are opened.

The operation switches 65 and 67 are turned on when operation portions (not shown) are operated and turned off in response to the cancellation of the operations to the operation portions. When the operation switches 65 and 67 are turned on, the input terminals Ti5 and Ti6 are grounded through the operation switches 65 and 67, so that the signals inputted into the microcomputer 5 through the connection lines L5 and L6 are changed from the high level to the low level, respectively.

When the microcomputer 5 detects that each of the input signals inputted therein through the connection lines L5 and L6 has been changed from the high level to the low level, the microcomputer changes the output signals outputted to the transistors Tr3 and Tr4 respectively through the connection lines L11 and L12 from the low level to the high level, whereby the motors 61 and 63 are supplied with power through the output terminals To2 and To3, thereby to open the trunk and the lid of the fuel supply opening.

Figure 6:
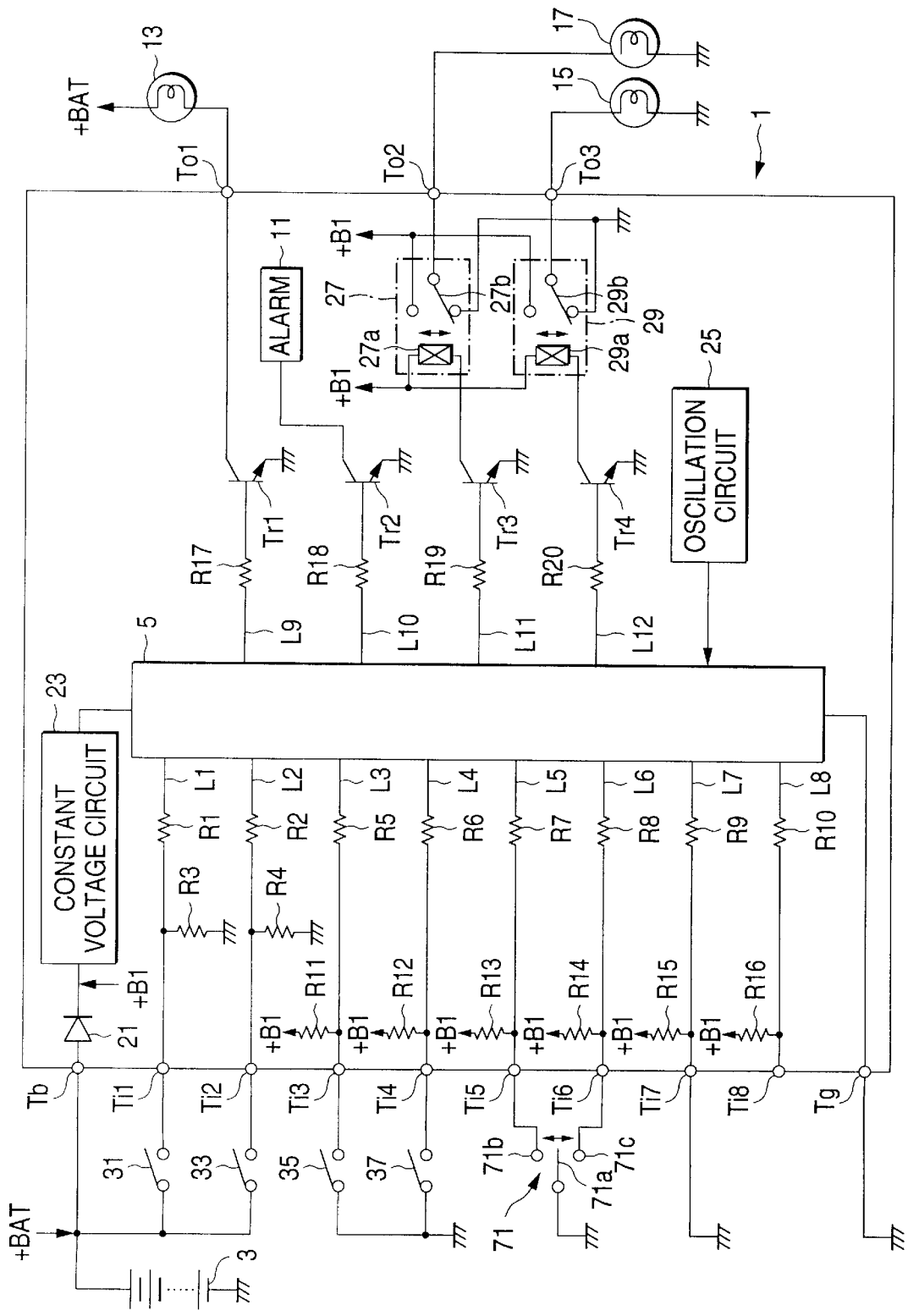
FIG. 6 is a block diagram showing an arrangement of an on-vehicle electronic control unit according to an embodiment of the invention wherein cornering lamps are connected as an optional equipment.

In FIG. 6, the right and left cornering lamps 17 and 15 are connected to the output terminals To2 and To3, respectively, and a blinker switch 71 for turning on and off the blinkers is connected to the output terminal Ti5 and Ti6, so that the cornering lamps 15 and 17 are controlled on the basis of the signal outputted from the blinker switch 71. In this arrangement, the input terminal Ti7 is grounded and the input terminal Ti8 is opened.

The blinker switch 71 includes a grounded movable contact 71a interlocked with an operation portion (not shown) and two contacts 71b, 71c connected to the input terminals Ti5, Ti6, respectively. The movable contact 71a is selectively connected to one of the contacts 71b and 71c when the operation portion is operated in accordance with a change of the running direction of a vehicle, and automatically restored to a state being connected to none of the contacts 71b and 71c when the change of the running direction of the vehicle has been completed and the steering wheel of the vehicle is restored.

When the microcomputer 5 detects that the blinker switch 71 is operated at the time of changing the running direction of the vehicle, and the level of one of the input signals inputted to the microcomputer through the connection lines L5 and L6 is changed from the high level to the low level, the microcomputer changes the level of the corresponding one of the output signals respectively outputted to the transistors Tr3 and Tr4 through the connection lines L11 and L12 from the low level to the high level, until the level of the aforesaid one of the input signals inputted to the microcomputer is restored from the low level to the high level. In response to the fact that the level of the aforesaid one of the input signals inputted to the microcomputer has been restored from the low level to the high level, the microcomputer changes the level of the corresponding one of the output signals outputted to the transistors Tr3 and Tr4 having been set at the high level to the low level. As a consequence, the corresponding one of the cornering lamps 15 and 17 is supplied with power through the output terminal To2 or To3, whereby the cornering lamp 15 or 17 associated with the direction to which the vehicle changes its running direction, that is, the cornering lamp on the same side as the blinker which is blinking, is turned on during a period where the associated blinker is turned on.

Figure 7:
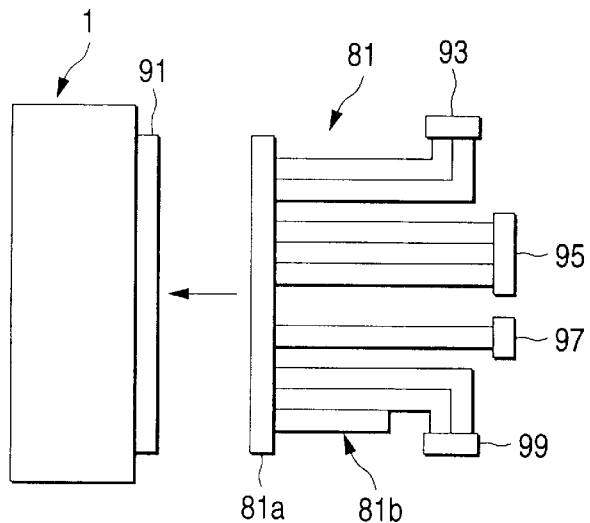
FIG. 7(a) is a diagram showing the relationship between a wire harness and the electronic control unit corresponding to the combination of electrical equipment shown in FIG. 1.
FIG. 7(b) is a diagram showing a wire harness corresponding to the combination of electrical equipment shown in FIG. 4.
FIG. 7(c) is a diagram showing a wire harness corresponding to the combination of electrical equipment shown in FIG. 5.
FIG. 7(d) is a diagram showing a wire harness corresponding to the combination of electrical equipment shown in FIG. 6.
Figure 7:
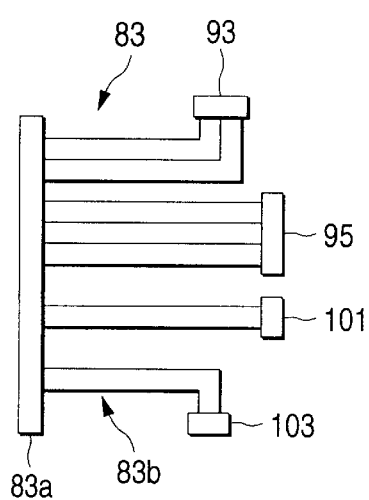
Figure 7:
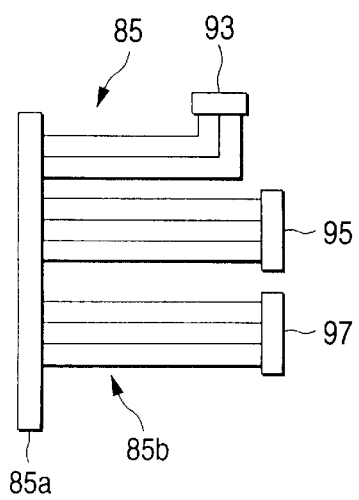
Figure 7:
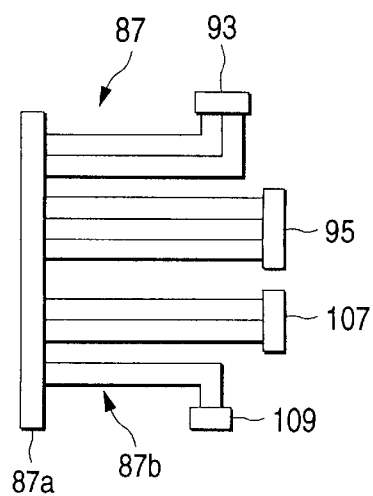

FIG. 7(a) is a diagram showing the relationship between a wire harness 81 and the electronic control unit corresponding to the combination of the electrical equipment shown in FIG. 1, FIG. 7(b) is a diagram showing a wire harness 83 corresponding to the combination of the electrical equipment shown in FIG. 4, FIG. 7(c) is a diagram showing a wire harness 85 corresponding to the combination of the electrical equipment shown in FIG. 5, and FIG. 7(d) is a diagram showing a wire harness 87 corresponding to the combination of the electrical equipment shown in FIG. 6. In the respective wire harnesses 81, 83, 85 and 87, the corresponding portions are labeled with the same reference numerals and the explanation thereof is omitted.

The wire harnesses 81, 83, 85 and 87 are provided, as the common arrangement, with connectors 81a, 83a, 85a and 87a connected to the connector 91 of the electronic control unit 1, respectively, and further each of the wire harnesses is provided with a connector 93 for connecting the electronic control unit 1 to the anode and cathode electrode terminals of the battery and the room lamp 13, and a connector 95 for connecting the electronic control unit 1 to the ignition switch 31, accessory switch 33, key detection switch 35 and courtesy switch 37.

Individually, the wire harness 81 is provided with a connector 97 for connecting the electronic control unit 1 to the respective motors 41a to 41d for the electric door lock system, and a connector 99 for connecting the input terminals Ti5 and Ti6 of the electronic control unit 1 to the operation switch 43 and for connecting the input terminals Ti7 and Ti8 thereof to the ground.

The wire harness 83 is provided with a connector 101 for connecting the electronic control unit 1 to the respective motors 51a to 51d for the electric flexible outer mirrors, and a connector 103 for connecting the input terminal Ti5 of the electronic control unit 1 to the operation switch 53 and for connecting the input terminal Ti8 thereof to the ground.

The wire harness 85 is provided with a connector 105 for connecting the electronic control unit 1 to the respective motors 61 and 63 of the trunk opener and the fuel opener, and for connecting the input terminals Ti5 and Ti6 of the electronic control unit 1 to the operation switches 65 and 67, respectively.

The wire harness 87 is provided with a connector 107 for connecting the input terminals Ti5 and Ti6 of the electronic control unit 1 to the blinker switch 71, and for connecting the input terminal Ti7 thereof to the ground, and a connector 109 for connecting the electronic control unit 1 to the left and right cornering lamps 15 and 17.

In the respective wire harnesses 81, 83, 85 and 87, the connectors 81a, 83a, 85a and 87a of the electronic control unit 1 side are connected to the respective connectors 93, 95, etc. connected to the respective electrical equipment, etc. through predetermined wires 81b, 83b, 85b and 87b, respectively. The connector 91 and the connectors 81a, 83a, 85a and 87a are made common in standards, such as configuration or the like, so that any one of the connectors 81a, 83a, 85a and 87a of the wire harnesses 81, 83, 85 and 87 can be connected to the connector 91 of the electronic control unit 1.

Figure 8:
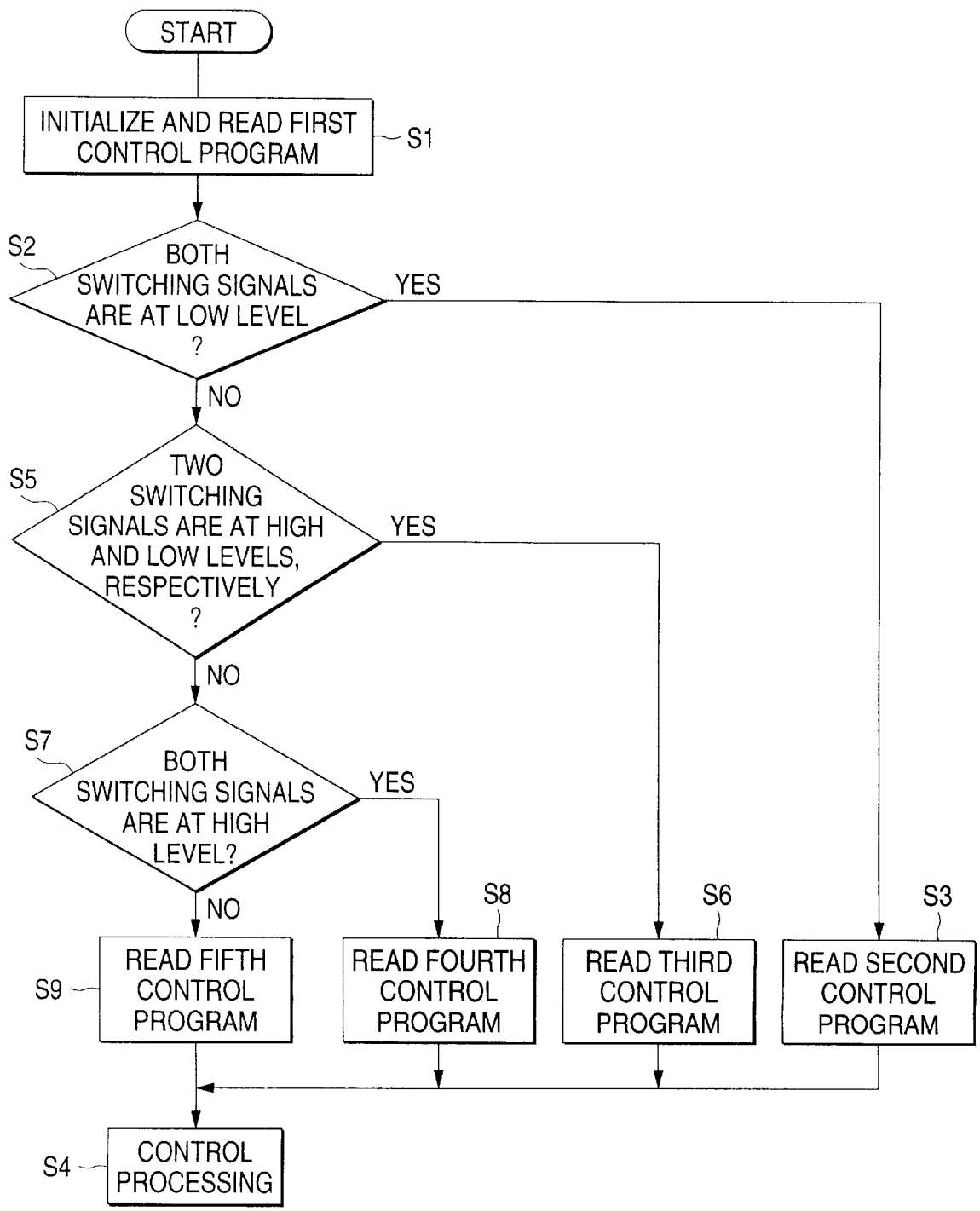
FIG. 8 is a flow chart showing the control operation of the microcomputer provided in the on-vehicle electronic control unit shown in FIG. 1.

FIG. 8 is a flow chart showing the control operation of the microcomputer 5 provided in the electronic control unit 1. In step S1, when the electronic control unit 1 is connected to both the battery 3 and the respective electrical equipment, and the power is initially supplied to the microcomputer 5, a predetermined initialization is performed, and then the first control program 30a for controlling the normally provided electrical equipment of the alarm 11 and the room lamp 13 is read from the memory portion 5a and stored in the control portion 5b. Then, the process proceeds to step S2.

In step S2, it is determined by the switching portion 5c whether or not both the input terminals Ti7 and Ti8 are grounded, that is, whether or not both the switching signals inputted into the microcomputer through the connection lines L7 and L8 are at the low level. If it is determined Yes in step S2, the process proceeds to step S3, in which the second control program 30b for controlling the electric door lock system is read from the memory portion 5a and stored in the control portion 5b. Then, the process proceeds to step S4. In contrast, if it is determined No in step S2, the process proceeds to step S5.

In step S5, it is determined by the switching portion 5c whether or not the input terminal Ti7 is opened and the input terminal Ti8 is grounded, that is, whether or not the switching signals inputted into the microcomputer through the connection lines L7 and L8 are at the high and low levels, respectively. If it is determined Yes in step S5, the process proceeds to step S6, in which the third control program 30c for controlling the electric flexible outer mirrors is read from the memory portion 5a and stored in the control portion 5b. Then, the process proceeds to step S4. In contrast, if it is determined No in step S5, the process proceeds to step S7.

In step S7, it is determined by the switching portion 5c whether or not both the input terminals Ti7 and Ti8 are opened, that is, whether or not both the switching signals inputted into the microcomputer through the connection lines L7 and L8 are at the high level. If it is determined Yes in step S7, the process proceeds to step S8, in which the fourth control program 30d for controlling the fuel opener and the trunk opener is read from the memory portion 5a and stored in the control portion 5b. Then, the process proceeds to step S4. In contrast, if it is determined No in step S7, the process proceeds to step S9, in which the fifth control program 30e for controlling the cornering lamps 15 and 17 is read from the memory portion 5a and stored in the control portion 5b. Then, the process proceeds to step S4.

In step S4, the control portion 5b controls the respective electrical equipment on the basis of the control programs 30a to 30e read in steps S1, S3, S6, S8 and S9.

As described above, according to the present embodiment, when the levels of the switching signals inputted into the microcomputer 5 are changed by grounding and/or opening the input terminals Ti7 and Ti8, one of the control programs 30a to 30e stored in the memory portion 5a corresponding to the combination of the electrical equipment to be controlled is read in accordance with the levels of the inputted switching signals and read into the control portion 5b, whereby the control mode of the control portion 5b is set to one corresponding to the combination of electrical equipment to be controlled. Accordingly, various kinds of combinations of electrical equipment to be mounted on a vehicle can be controlled by the electronic control unit of the common arrangement without changing the arrangement of the microcomputer 5, the print circuit board or similar devices, whereby it becomes possible to reduce the number of parts of the electronic control unit to a large extent and reduce a cost thereof.

In particular, conventionally, multiple types of ROMs storing the dedicated control programs corresponding to the respective electrical equipment to be controlled are prepared in accordance with the types of electrical equipment to be mounted optionally on a vehicle, that is, in accordance with the types of electrical equipment to be controlled. Then, the type of ROM to be used is changed in accordance with the type of combination of the electrical equipment. As a consequence, since the number of types of ROMs to be prepared becomes large, the problems arise that the developing cost and the management cost are increased, and that an incorrect type of ROM may be employed erroneously.

In contrast, in the present embodiment, the memory portion (ROM) 5a of the microcomputer 5 stores multiple types of control programs 30a to 30e corresponding to the types of combinations of electrical equipment to be connected to the electronic control unit 1, and one of the control programs 30a to 30e is selectively read upon request. Accordingly, in the present embodiment, since various types of combinations of electrical equipment can be controlled by using only one type of ROM, the developing cost and the management cost can be reduced to a large extent, and it becomes possible to eliminate the problem that an incorrect type of ROM may be employed erroneously.

Further, in the present embodiment, the connector 91 of the electronic control unit 1 is made common in standards such as configuration or the like with the connectors 81a, 83a, 85a and 87a of the wire harnesses 81, 83, 85 and 87 corresponding to the respective types of combinations of the electrical equipment. Accordingly, the connector 91 of the electronic control unit 1 can be used commonly for the various types of combinations of the electrical equipment, so that the number of parts of the electronic control unit can further be reduced and the manufacturing cost thereof can also be reduced.

In the aforesaid embodiment, the situation where the electronic control unit 1 is adapted to the four types of combinations of electrical equipment has been described. However, the invention may be arranged to increase the types of electrical equipment to be controlled and the types of combinations of electrical equipment to be accorded by increasing the number of the input terminals Ti1 to Ti6 for inputting signals required for control, the number of the input terminals Ti7 and Ti8 for inputting the switching signals and the number of the output terminals To1 to To3 upon request. In this case, the number of the electrical equipment to be controlled may be changed at every type of combination of electrical equipment.

As described above, according to the invention, the respective pieces of electrical equipment are controlled such that the control means, which has multiple types of control modes corresponding to the types of combinations of the electrical equipment to be controlled, changes its control mode to one which corresponds to the type of combination of the electrical equipment connected to the input and output terminals on the basis of the signal inputted through the switching terminal. Accordingly, various types of combinations of electrical equipment can be controlled by the electronic control unit of the common arrangement without changing the arrangement of the microcomputer, the print circuit board or the like, which makes it possible to reduce the number of parts of the electronic control unit to a large extent and reduce the cost thereof.

What is claimed is:

1. An on-vehicle electronic control unit provided in a vehicle for use with multiple types of electrical equipment, including at least one type of input side electrical equipment and at least one type of output side electrical equipment, mountable on the vehicle, comprising:

an input terminal electrically connectable to the at least one type of input side electrical equipment of the multiple types of electrical equipment mountable on the vehicle, an output terminal electrically connectable to the at least one type of output side electrical equipment of the multiple types of electrical equipment mountable on the vehicle, a switching terminal which receives a signal representing which of the multiple types of electrical equipment is connected to the input terminal and the output terminal, and a controller connected to the input terminal, the output terminal and the switching terminal, the controller having multiple types of control modes such that a control mode of the multiple types of control modes can be changed in accordance with a combination of the multiple types of electrical equipment to be connected to the input terminal and the output terminal, the controller changing the control mode, in accordance with the signal received by the switching terminal, to another control mode corresponding to the combination of the multiple types of electrical equipment represented by the signal, and controlling the output side electrical equipment connected to the output terminal in accordance with the input signal inputted from the input side electrical equipment through the input terminal.

2. The on-vehicle electronic control unit according to claim 1, wherein the controller includes:

a memory portion that stores multiple types of control programs, in accordance with the type of the output side electrical equipment to be connected to the output terminal, for controlling the output side electrical equipment connected to the output terminal in accordance with the input signal inputted from the input side electrical equipment through the input terminal, a control portion that controls the output side electrical equipment connected to the output terminal based on the input signal inputted from the input side electrical equipment through the input terminal in accordance with one of the multiple types of control programs read from the memory portion, and a switching portion for informing the control portion of one type of control program to be read, corresponding to the output side electrical equipment connected to the output terminal, from the multiple types of control programs stored in the memory portion based on the signal inputted through the switching terminal so as to change the control mode of the controller into the control mode corresponding to the combination of electrical equipment connected to the input terminal and the output terminal.

3. An on-vehicle electronic control unit provided in a vehicle for use with multiple types of electrical equipment, including at least one type of input side electrical equipment and at least one type of output side electrical equipment, mountable on the vehicle, comprising:

an input terminal electrically connectable to the at least one type of input side electrical equipment of the multiple types of electrical equipment mountable on the vehicle, an output terminal electrically connectable to the at least one type of output side electrical equipment of the multiple types of electrical equipment mountable on the vehicle, switching terminal means for receiving a signal representing which of the multiple types of electrical equipment is connected to the input terminal and the output terminal, and control means, connected to the input terminal, the output terminal and the switching terminal means, and having multiple types of control modes such that a control mode of the multiple types of control modes can be changed in accordance with a combination of the multiple types of electrical equipment to be connected to the input terminal and the output terminal, for changing the control mode, in accordance with the signal received by the switching terminal means to another control mode corresponding to the combination of the multiple types of electrical equipment represented by the signal, and controlling the output side electrical equipment connected to the output terminal in accordance with the input signal inputted from the input side electrical equipment through the input terminal.

4. The on-vehicle electronic control unit according to claim 3, wherein the control means includes:

memory means for storing multiple types of control programs, in accordance with the type of the output side electrical equipment to be connected to the output terminal, for controlling the output side electrical equipment connected to the output terminal in accordance with the input signal inputted from the input side electrical equipment through the input terminal, control portion means for controlling the output side electrical equipment connected to the output terminal based on the input signal inputted from the input side electrical equipment through the input terminal in accordance with one of the multiple types of control programs read from the memory means, and switching portion means for informing the control portion means of one type of control program to be read, corresponding to the output side electrical equipment connected to the output terminal, from the multiple types of control programs stored in the memory means based on the signal inputted through the switching terminal means so as to change the control mode of the control means into the control mode corresponding to the combination of electrical equipment connected to the input terminal and the output terminal.

5. A method of controlling multiple types of electrical equipment, including at least one type of input side electrical equipment and at least one type of output side electrical equipment, mountable on a vehicle, comprising the steps of:

electrically connecting an input terminal to the at least one type of input side electrical equipment of the multiple types of electrical equipment mountable on the vehicle, electrically connecting an output terminal to the at least one type of output side electrical equipment of the multiple types of electrical equipment mountable on the vehicle, receiving a signal, representing which of the multiple types of electrical equipment is connected to the input terminal and the output terminal, with a switching terminal, and changing, with a controller having multiple types of control modes and connected to the input terminal, the output terminal and the switching terminal, a control mode of the multiple types of control modes, in accordance with the signal received by the switching terminal, to another control mode corresponding to the combination of the multiple types of electrical equipment represented by the signal, and controlling the output side electrical equipment connected to the output terminal in accordance with the input signal inputted from the input side electrical equipment through the input terminal.

6. The method according to claim 5, wherein the step of changing includes the steps of:

storing, with a memory portion, multiple types of control programs, in accordance with the type of the output side electrical equipment to be connected to the output terminal, for controlling the output side electrical equipment connected to the output terminal in accordance with the input signal inputted from the input side electrical equipment through the input terminal, controlling, with a control portion, the output side electrical equipment connected to the output terminal based on the input signal inputted from the input side electrical equipment through the input terminal in accordance with one of the multiple types of control programs read from the memory portion, and informing, with a switching portion, the control portion of one type of control program to be read, corresponding to the output side electrical equipment connected to the output terminal, from the multiple types of control programs stored in the memory portion based on the signal inputted through the switching terminal so as to change the control mode of the controller into the control mode corresponding to the combination of electrical equipment connected to the input terminal and the output terminal.

* * * * *